May 25, 1965 F. A. MULLER 3,184,850
CLAMP FOR PANTOGRAPH ARMS
Filed April 27, 1962
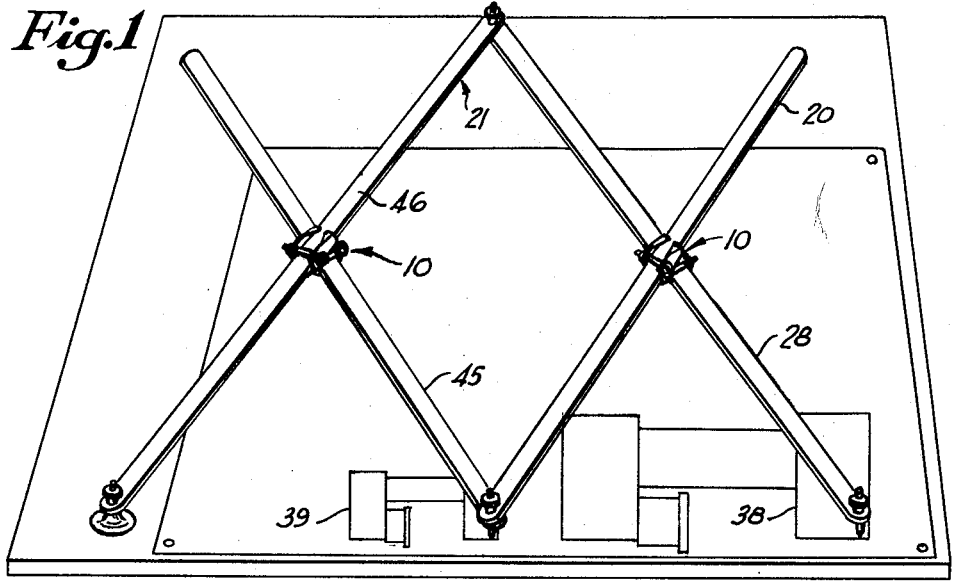
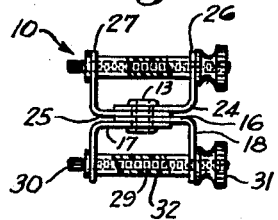
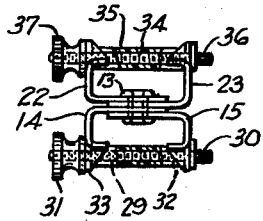
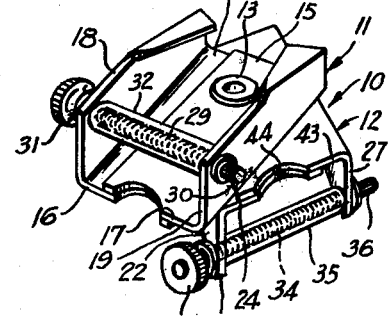
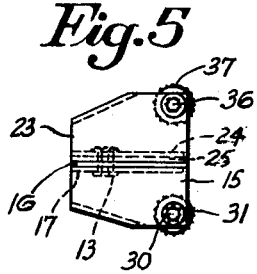
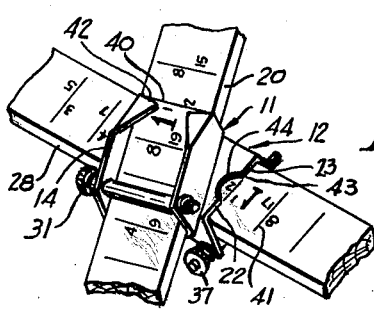
INVENTOR.
FRANK MULLER
BY Richards & Geier
ATTORNEYS United States Patent Office 3,184,850
Patented May 25, 1965

3,184,850
CLAMP FOR PANTOGRAPH ARMS
Frank A. Muller, 20 S. Center Ave.,
Rockville Centre, N.Y.
Filed Apr. 27, 1962, Ser. No. 190,714
4 Claims. (Cl. 33—25)

This invention relates to pantograph construction and refers more particularly to clamping means for connecting together the arms of an adjustable pantograph.

Pantographs, particularly those used for drafting reproductions, are oftentimes made with adjustable arms so that the arm length ratios can be varied in order to reproduce both enlarged and reduced scale drawings from a master or original copy. In general, the arms comprising the pantograph contain holes designating certain reproduction scales. To arrange the pantograph for a particular scale, the arms are set up with the alike holes in alignment and bolts are passed through the holes and wing nuts or similar fasteners inserted on the bolts, the result being that the arms of the pantograph are held securely connected together in the proper and desired reproduction ratio. A major drawback of this means of connecting the pantograph arms is that after repeated use, the holes in the arms elongate and hence reproduction ratios become inaccurate. Another drawback is that the nuts and bolts which must be completely removed from the arms when changing a ratio are easily misplaced or lost. Furthermore, the nuts and bolts become loose during working of the pantograph so that the instrument becomes inaccurate. On the other hand, tightening the bolts too much retards the free motion of the pantograph arms required for proper operation.

It is therefore, the primary object of the present invention to provide a clamp for a pantograph which permits the pantograph arms to be adjusted to different reproduction ratios.

Another object is to provide a clamp for adjusting pantograph arm length ratios which eliminates the need for using bolt holes in the pantograph arms and hence obviates potential elongation of the holes with resulting inaccuracies in arm reproduction ratios.

A further object is to provide a clamp for adjusting pantograph arm ratios which holds the arms securely without chance of slippage.

A still further object is to provide a clamp for adjusting pantograph arm ratios which is simple to use, and easy and cheap to make.

A yet further object is to provide a clamp for adjusting pantograph arm ratios which when used to make adjustments does not entail removal of any of its component parts and hence avoids their misplacement or accidental loss.

Other objects of the present invention will become apparent in the course of the following specification.

In achieving the aforementioned objectives of the present invention, it was found advantageous to provide a clamp which comprises two channel like clamping members which are swingably connected to each other in back to back relation by means of a rivet. Each clamping member consists of two side by side angle pieces each of which has a support flange extending in the direction of the other angular piece, the flanges overlapping each other for a distance and the above-mentioned rivet passing through both support flanges. Each angular piece also has another or retainer flange extending at a right angle to the support flanges, so that they (retainer flanges) are arranged in spaced substantially parallel relation to each other. The two angle pieces thus provide channel like structures which embrace each of a pair of intersecting arms of a pantograph. Clamping action is effected by means of a bolt which passes through the retainer flanges of each clamping member. Tightening up on a nut threaded on one end of the bolt will cause the angle pieces of each clamping member to pivot inwardly towards each other and they will engage the sides of the pantograph arm in a strong frictional bond. Since the two clamping members are swingably connected, they will allow free angular movement between the pantograph arms in the manner well known in the art. In use, the clamping members are slided along on the pantograph arms until the same designated reproduction ratios on each arm align with designated marks on the clamping members. The clamping members are then clamped tight by means of the nuts and bolts and the pantograph thereafter will reproduce drawings, etc., be they enlargements or reductions, in accordance with the selected arm ratios.

The invention will appear more clearly from the following detailed description when taken in conjunction with the accompanying drawing showing, by way of example, a preferred embodiment of the inventive concept.

In the drawing:

FIGURE 1 is a perspective view showing an adjustable pantograph, the arms being interconnected by means of clamps constructed in accordance with the principles of the present invention.

FIGURE 2 is an exploded fragmentary view showing the manner in which the clamp interconnects one pair of pantograph arms.

FIG. 3 is an end elevational view of a clamp constructed in accordance with the principles of the present invention.

FIGURE 4 is an elevational view of the clamp shown in FIGURE 3 as viewed from the opposite end.

FIGURE 5 is a side elevational view of FIGURE 3; and

FIGURE 6 is an enlarged perspective view of the clamp.

Throughout the specification, like reference numerals are used to indicate like parts.

The clamp 10 of the present invention comprises two identical channel like clamping members 11 and 12 which are swingably connected together in back to back relation by means of a rivet 13 (FIG. 6). Clamping member 11 consists of two side by side angle pieces 14 and 15 which have, respectively, the supporting flanges 16 and 17 which are arranged in parallel overlapping relationship with the rivet 13 passing through both support flanges, so that the support flanges are also swingable with respect to each other. The angle pieces 14 and 15 also have, respectively, the retaining flanges 18 and 19, the retaining flanges being substantially normal to the planes of the support flanges. It is thus seen that the angle pieces 14 and 15 constitute a channel like structure which will embrace one arm 20 of a pair of intersecting arms of a pantograph 21 (FIG. 2).

Clamping member 12, similarly, consists of two angle pieces 22 and 23 which have, respectively, supporting flanges 24 and 25 and retaining flanges 26 and 27. The angle pieces 22 and 23 embrace the other of the pair of intersecting arms 28 of the pantograph 21.

Clamping member 11 carries adjacent one end a machine screw 29 which extends transversely across the clamping member 11 and through its retaining flanges 18 and 19. The machine screw 29 has an integral cap 30 at one end to prevent its being withdrawn from the clamping member 11. Threaded on machine screw 29 at the other end is a thumb nut 31 which when tightened, exerts a force on angle pieces 14 and 15 causing them to swing inwardly at one end reducing the span between retainer flanges 18 and 19. The retainer flanges thus engage the sides of pantograph arm 20 in a strong frictional bond and prevent the clamping member 11 from moving on the arm once a particular arm ratio is set (FIG. 2). A tubular spacer piece 32 encloses the machine screw 29 between retaining flanges 18 and 19 for the purpose of making fine adjustment settings in the arm ratios. In use its function is similar to that of the fine adjustment spindle on a micrometer. The exact manner of its use will be more fully described later on. In the drawing, the spacer piece 32 is shown as being of a transparent material as, for example, plastic, although it may be advantageously made of other materials.

To further enhance the security with which the clamping member 11 engages the pantograph arm, the retaining flanges 18 and 19 have sloping, inwardly bent portions as at 33 which prevent the pantograph arm from rocking upwardly in the clamping member during use.

Clamping member 12 has a machine screw 34, spacer piece 35, cap 36 and thumb nut 37 which are identical in all respects to those previously described.

In use:

FIGURE 1 illustrates an adjustable pantograph 21 comprising two pairs of intersecting arms including the pair of arms 20 and 28. The adjustable pantograph is old and well known in the art, as is its function of reproducing an enlarged trace 38 from a smaller master or copy 39 and vice versa. To use the clamp of the present invention, the clamping member 11 is inserted over the end of arm 20 and similarly the clamping member 12 is inserted over the end of arm 28. To facilitate the latter, the ends of the arms 20 and 28 may be drawn together and since the clamping members 11 and 12 are swingable with respect to each other they can be angularly adjusted until they align with the ends of the arms. By sliding the clamp on the arms it may be moved to positions on the arms wherein clamping members 11 and 12 align with particular ratio designation indicia 40 and 41, respectively (FIG. 2). As the clamp is being moved on the arms 20 and 28, the arms will swing away from each other to the generally intersecting position shown in FIGURE 1. When the end edges 42 of bend portions 33 of clamping member 11 align with the indicia mark 40 designating the desired reproduction ratio, as, for example, the "1½" ratio shown in FIGURE 2, the clamping member 11 is clamped tightly to the arm by means of machine screw 29 and thumb nut 31. Arm 28 is set at the same ratio by tightening machine screw 34 on clamping member 12. Clamping member 12 is properly aligned with indicia 41 when the edges 43 of the clamping member align with the "1½" ratio mark on arm 28. To facilitate reading the numerals on the arm 28, clamping member 12 has a slotted portion 44, the slots being formed in both angle pieces of the clamping member. With the clamping member 11 and 12 clamped tight at the desired "1½" ratio, the arms 20 and 28 will move in such manner that the trace 38 will be reproduced at one and one-half times larger than the copy 39. Since clamping members 11 and 12 are swingable relative to each other, the free and smooth movement of the arms 20 and 28 will be achieved in the manner customary in pantograph operation. Of course, a similar clamp is used for connecting the other pair of intersecting arms 45 and 46, these arms being arranged on the same ratios as the arms 20 and 28 (FIG. 1).

As was previously mentioned, the tubular spacer piece 32 may be utilized for making fine adjustments. Thus clamping member 11 may be moved on the arm 20 by sliding until it is almost aligned with the indicia mark 40. Since however, it is difficult to align edges 42 exactly on the indicia mark by a mere sliding action with the fingers, the space piece is utilized to insure fine adjustment. The space piece rests on top of arm 20. With the machine screw in a loosened condition, one need only apply thumb pressure to the spacer piece causing it to rotate. This action will effect a fine controlled sliding to the arm 20 causing it to move the required distance for effecting the proper and accurate setting.

The clamp of the present invention, therefore, provides for simple and quick adjustment of pantograph arm ratios. Furthermore, the clamp is an arrangement of permanently connected elements, so that chance of misplacing a screw, etc. is eliminated. Additionally, the clamp is a time saver in that the arm ratios can be changed in a matter of seconds, whereas prior art construction requires that a screw be removed from one ratio hole and inserted in another hole to adjust the ratios.

While there is above disclosed but one embodiment of the clamp, it is possible to produce still other embodiments without departing from the inventive concept herein disclosed.

What is claimed is:

1. A clamp for use in connecting together a pair of intersecting pantograph arms, said clamp comprising a pair of clamping members each comprising a pair of opposed angle pieces having back flanges extending in parallel overlapping relation, and a side flange integral with each of said back flanges and extending substantially normal thereto, each pair of angle pieces forming a channel like structure adapted to embrace one arm of said pair of intersecting pantograph arms, means swingably connecting each pair of angle pieces to each other and said clamping members to each other in back to back relation, and unreleasable means carried by said side flanges for urging said side flanges into contact with said pantograph arms.

2. A clamp for use in connecting together a pair of intersecting pantograph arms, said clamp comprising a pair of clamping members each comprising a pair of opposed angle pieces having back flanges extending in parallel overlapping relation, and a side flange integral with each of said back flanges and extending substantially normal thereto, each pair of angle pieces forming a channel like structure adapted to embrace one arm of a pair of intersecting pantograph arms, a rivet swingably connecting the back flanges of each pair of angle pieces to each other and each of said clamping members to each other in back to back relation, and releasable means carried by said side flanges for swinging said side flanges towards each other at one end and into contact with said pantograph arms.

3. A clamp for use in connecting together a pair of intersecting pantograph arms, said clamp comprising a pair of clamping members each comprising a pair of opposed angle pieces having back flanges extending in parallel overlapping relation, and a side flange integral with each of said back flanges and extending substantially normal thereto, said side flanges having aligned holes adjacent one end, each pair of angle pieces forming a channel like structure adapted to embrace one arm of said pair of intersecting pantograph arms, a rivet swingably connecting the back flanges of each pair of angle pieces to each other and each of said clamping members to each other in back to back relation, a screw loosely mounted in the side flange holes of each of said clamping members, a cap carried at one end of said screw to restrict its axial movement in said holes, and a thumb nut mounted on the other end of said screw whereby a rotation of said thumb screw will cause said angle pieces to swing inwardly at one end and into contact with said pantograph arms.

4. A clamp in accordance with claim 3 further comprising tubular spacer pieces enclosing said machine screws and extending between said side flanges, said tubular spacer pieces being rotatable on said screws and being adapted to engage said arms whereby rotation of said tubular pieces will cause said arms to slide axially within said clamping members.

References Cited by the Examiner
UNITED STATES PATENTS

| | | | |
|---|---|---|---|
| 265,744 | 10/82 | Braastad | 33—25 |
| 591,709 | 10/97 | Weber | 33—143 |
| 876,162 | 1/08 | Flood. | |
| 970,641 | 9/10 | O'Neil | 33—158 |

FOREIGN PATENTS 21,065  1912  Great Britain.

ISAAC LISANN, *Primary Examiner.*